United States Patent
Gerber et al.

(10) Patent No.: US 8,484,289 B2
(45) Date of Patent: Jul. 9, 2013

(54) NETWORK BASED AUDIENCE MEASUREMENT

(75) Inventors: Alexandre Gerber, Madison, NJ (US); Jeffrey Erman, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 453 days.

(21) Appl. No.: 12/636,365

(22) Filed: Dec. 11, 2009

(65) Prior Publication Data

US 2011/0145211 A1 Jun. 16, 2011

(51) Int. Cl.
G06F 15/16 (2006.01)

(52) U.S. Cl.
USPC ............. 709/204; 709/228; 705/7.29; 705/30

(58) Field of Classification Search
USPC .............................. 709/204, 228; 705/7.29, 30
See application file for complete search history.

(56) References Cited

U.S. PATENT DOCUMENTS

| | | | | |
|---|---|---|---|---|
| 7,610,225 B2 * | 10/2009 | O'Neill | ........................... | 705/30 |
| 8,000,993 B2 * | 8/2011 | Harvey et al. | ................ | 705/7.29 |
| 2006/0212933 A1 * | 9/2006 | Scoggins et al. | ................ | 726/11 |
| 2008/0027806 A1 * | 1/2008 | Martine et al. | ................. | 705/14 |
| 2009/0248517 A1 * | 10/2009 | Tran et al. | ........................ | 705/14 |
| 2011/0302633 A1 * | 12/2011 | Windschauer | .................... | 726/4 |

* cited by examiner

*Primary Examiner* — Tammy Nguyen
(74) *Attorney, Agent, or Firm* — Hartman & Citrin LLC

(57) ABSTRACT

Methods, systems, and computer-readable media for providing network-based audience measurement are provided. Data packets are intercepted between a client computer and a content server. Unique subscribers and content names are identified based on the data packets. One or more audience measurement metrics are computed based on the unique subscribers and the content names.

20 Claims, 3 Drawing Sheets

NETWORK BASED AUDIENCE MEASUREMENT

BACKGROUND

This application relates generally to the field of computer networks. More specifically, the disclosure provided herein relates to network-based audience measurement.

Internet service providers may be interested in the amount of time that users spend online accessing content controlled and provided by Internet content providers. The determination of the amount of time that users spend online accessing content may be referred to as audience measurement. For example, service providers may utilize audience measurement data to determine the popularity of websites and content and to establish advertising rates. Audience measurement is conventionally performed using one of two implementations: (1) a server-side implementation and (2) a client-side implementation.

In the server-side implementation, a content provider may maintain server logs that record accesses to servers controlled by the content provider. For example, each time a user accesses a server controlled by the content provider, the content provider may record the user's Internet Protocol ("IP") address in the corresponding server log. However, separate server logs are typically maintained by different content providers, and some of the content providers may not release the server logs to the service provider. Further, since the server logs simply record IP addresses, the server logs may not be accurate as to the number of unique subscribers (e.g. multiple subscribers may access a server under the same, dynamically-assigned IP address).

In the client-side implementation, a service provider installs a monitoring device at or near each customer's computer and monitors the Internet usage of each customer through the monitoring device. The need to install a separate monitoring device for each customer can be cost prohibitive and may not be scalable. Further, due to the intrusive nature of the monitoring device, few customers may grant permission to the service provider to install the monitoring device, resulting in a relatively small sample size. Those few customers that do grant permission may only do so upon receiving some benefit in exchange, such as monetary payment, from the service provider.

SUMMARY

Embodiments of the disclosure presented herein include methods, systems, and computer-readable media for providing network-based audience measurement. According to one aspect, a method for providing network-based audience measurement is provided. According to the method, data packets are intercepted between a client computer and a content server. Unique subscribers and content names are identified based on the data packets. One or more audience measurement metrics are computed based on the unique subscribers and the content names.

According to another aspect, a system for providing network-based audience measurement is provided. The system includes a memory and a processor functionally coupled to the memory. The memory stores a program containing code for providing network-based audience measurement. The processor is responsive to computer-executable instructions contained in the program and configured to perform the following operations. Data packets are intercepted between a client computer and a content server. Unique subscribers and content names are identified based on the data packets. One or more audience measurement metrics are computed based on the unique subscribers and the content names.

According to yet another aspect, a computer-readable medium having instructions stored thereon for execution by a processor to perform a method for providing network-based audience measurement is provided. According to the method, data packets are intercepted between a client computer and a content server. Unique subscribers and content names are identified based on the data packets. One or more audience measurement metrics are computed based on the unique subscribers and the content names.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for providing network-based audience measurement. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
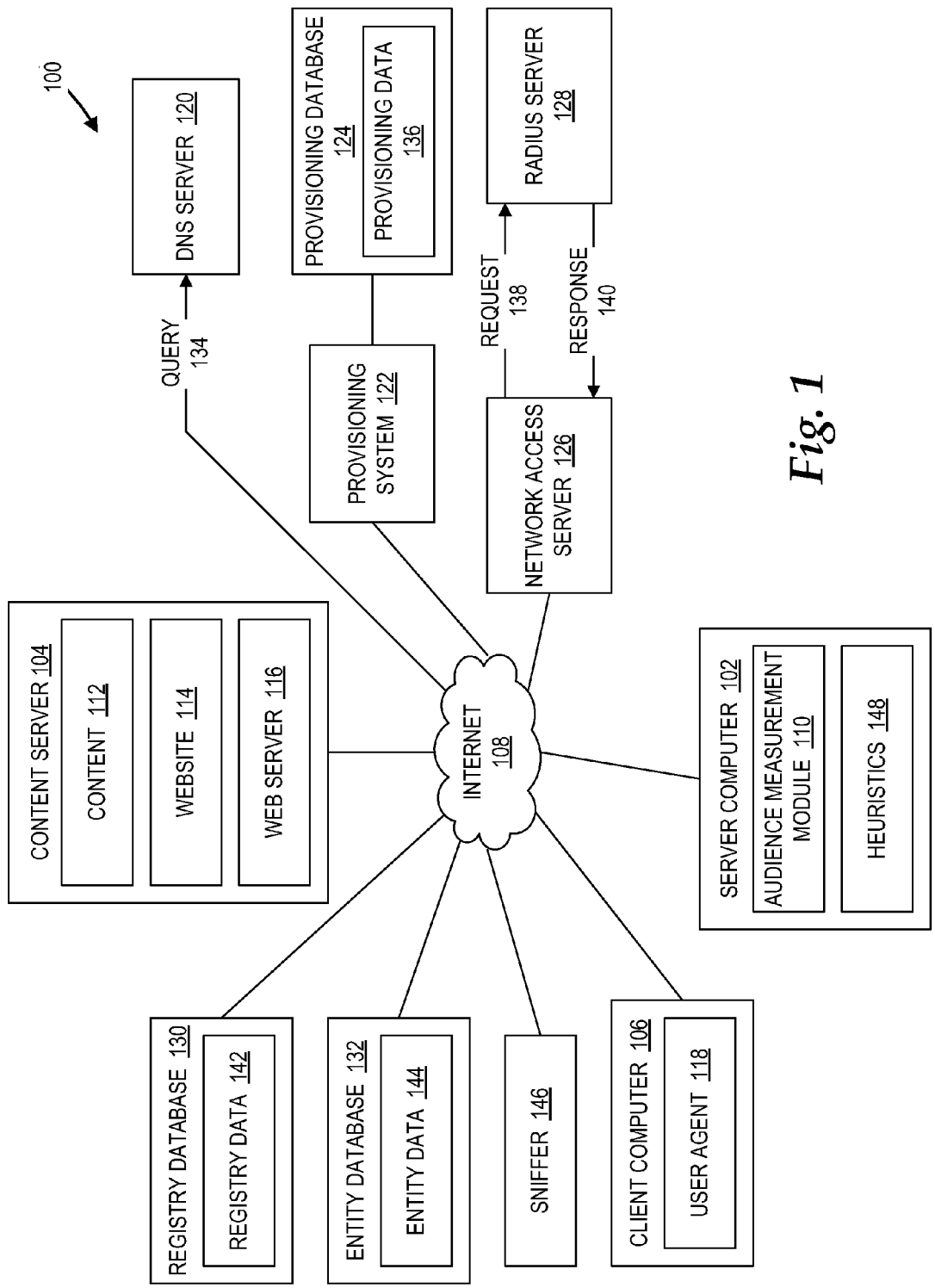
FIG. 1 is a block diagram illustrating an exemplary network environment configured to provide network-based audience measurement, in accordance with some embodiments.

In the following detailed description, references are made to the accompanying drawings that form a part hereof, and which are shown by way of illustration, specific embodiments, or examples. Referring now to the drawings, in which like numerals represent like elements through the several figures, FIG. 1 is a block diagram illustrating an exemplary network environment 100 configured to provide network-based audience measurement, in accordance with some embodiments. The network environment 100 may include a server computer 102, content server 104, and a client computer 106 coupled via a network 108, such as the Internet. Although only one server computer 102, one content server 104, and one client computer 106 are illustrated in FIG. 1, it should be appreciated that any suitable number of server computers, content servers, and client computers in any suitable arrangement may be similarly utilized. The server computer 102 may include an audience measurement module 110. According to embodiment, the audience measurement module 110 is configured to monitor a variety of audience measurement metrics. The operation of the audience measurement module 110 is described in greater detail below. The content server 104 may provide content 112 through a website 114 or directly to the client computer 106. The content 112 may include any suitable multimedia, including text, images, audio, video, and combinations thereof.

The content server 104 may further include a web server 116 adapted to deliver the website 114 and/or the content 112 to the client computer 106 upon request from the client computer 106. In particular, the client computer 106 may request access to the website 114 and/or the content 112 through a user agent 118. In one embodiment, the user agent 118 is a web browser. In further embodiments, the user agent 118 may be any suitable application adapted to request and receive the website 114 and/or the content 112 from the server computer 102.

The network environment 100 may further include a domain name system ("DNS") server 120, a provisioning system 122, a provisioning database 124, a network access server ("NAS") 126, a Remote Authentication Dial In User Service ("RADIUS") server 128, a registry database 130, and an entity database 132. The DNS server 120 may be configured to receive a DNS query 134 containing a domain name (also referred to herein as a content name). Upon receiving the DNS query 134, the DNS server 120 may translate the domain name to an IP address. The DNS server 120 may then return the IP address corresponding to the domain name. It should be appreciated that the operation of the DNS server 120 is well known and will not be described in further detail.

The client computer 106 may be associated with an IP address that identifies the client computer 106 over the network 108. The IP address may be assigned to a unique subscriber operating the client computer 106 according to at least two implementations. In a first implementation, the provisioning system 122 may statically assign an IP address to the media access control ("MAC") address of a network device, such as network devices 310 illustrated in FIG. 3, coupled to the client computer 106. The provisioning database 124 may store provisioning data 136 that includes data identifying the unique subscriber, the MAC address of the network controller, and the assigned IP address, among other information. In a second implementation, upon receiving a request from the client computer 106, a network access server ("NAS") 126 may transmit an authorization request 138 to the RADIUS server 128. The authorization request 138 may include a unique subscriber's credentials, such as the subscriber's username and password. When the RADIUS server 128 grants the authorization request 138, the RADIUS server 128 may dynamically assign an IP address to the unique subscriber. The RADIUS server may then responds with an authorization response 140 that includes the subscriber's username and the assigned IP address, among other information. It should be appreciated that the operations of the provisioning system 122, the provisioning database 124, and the RADIUS server 128 are well known and will not be described in further detail.

The registry database 130 may be configured to store registry data 142. According to embodiments, the registry data 142 includes data identifying IP addresses and content names corresponding to each of the IP addresses. For example, the registry data 142 may include data mapping the content name, www.att.com, to the IP address, 96.6.249.145. The entity database 132 may be configured to store entity data 144. According to embodiments, the entity data 144 includes data identifying content names and entity names corresponding to each of the content names. For example, the entity data 144 may include data mapping content names, www.google.com, www.gmail.com, and www.picasa.com, to GOOGLE, INC. In this way, different content names owned or controlled by the same entity can be consolidated.

According to embodiments, the audience measurement module 110 may be adapted to receive data packets that are intercepted by a sniffer 146 or other suitable device adapted to intercept data traffic. In particular, the sniffer 146 may be adapted to intercept one or more of the following: (a) data traffic between the content server 104 and the user agent 118 accessing the content 112, (b) the DNS query 134, and (c) the authorization response 140. Although only one sniffer is illustrated in FIG. 1, it should be appreciated that the network environment can include two or more sniffers in any suitable arrangement. According to further embodiments, the audience measurement module 110 may be further adapted to retrieve one or more of the following: (a) the provisioning data 136 from the provisioning database 124, (b) the registry data 142 from the registry database 130, and (c) the entity data 144 from the entity database 132.

According to embodiments, the audience measurement module 110 may merge the intercepted data traffic, the intercepted DNS query 134, the intercepted authorization response 140, the provisioning data 136, the registry data 142, and/or the entity data 144. The audience measurement module 110 may then identify unique subscribers and content names based on merged information. In particular, the intercepted data packets may each include a Hypertext Transfer Protocol ("HTTP") header specifying a source IP address, a destination IP address, and a timestamp that the data packet was sent. The audience measurement module 110 may identify a unique subscriber that maps to the source IP address. The audience measurement module 110 may identify the unique subscriber through the provisioning data 136 retrieved from the provisioning database 124 or from the intercepted authorization response 140. In particular, the provisioning database 124 and the authorization response 140 may include the username or other suitable identifier identifying the unique subscriber associated with the source IP address.

The audience measurement module 110 may also identify a content name that maps to the destination IP address. In some instances, the HTTP header may also specify a content name. For example, if the user agent 118 is a web browser and accesses the website 114, the user agent 118 may transmit data packets having a HTTP header that specifies a content name. However, in other instances, the HTTP header may not specify a content name. In one example, if the user agent 118 is not a web browser and directly accesses the content 112, the user agent 118 may transmit data packets having a HTTP header that does not specify a content name. In this case, the audience measurement module 110 may determine the content name through the DNS query 134. In particular, the DNS query 134 may include the content name, among other information. In another example, the user agent 118 is a web browser, but the user enters an IP address instead of a content name into the web browser. In this case, the audience measurement module 110 may determine the content name through the registry data 142. In particular, the registry data 142 may map IP addresses to corresponding content names.

Upon identifying the unique subscribers and the content names, the audience measurement module 110 may consolidate content names based on the entity data 144, as previously described. The audience measurement module 110 may then apply one or more heuristics 148 adapted to separate machine-generated data traffic from user-generated data traffic. The audience measurement module 110 may then remove the machine-generated data traffic. Examples of the machine-generated data traffic may include, but are not limited to, operating system and other software updates and virus scanner data file updates.

The heuristics 148 may distinguish machine-generated data traffic from user-generated data traffic according to any suitable characteristics of machine-generated data traffic. In one example, the client computer 106 may access a known update server (e.g., the WINDOWS UPDATE service from MICROSOFT CORPORATION) to retrieve software updates. In this case, the heuristics 148 may remove data traffic to and from the update server. In another example, the user agent 118 may be a virus update application that only accesses the network 108 in order to update virus data files. In this case, the heuristics 148 may remove data traffic to and from the user agent 118. In yet another example, the client computer 106 may access the content server 104 at fixed intervals (e.g., every twenty-four hours, every six hours, every hour, etc.). In this case, the heuristics 148 may measure the inter-arrival times of data packets to the content server 104. Those data packets having fixed inter-arrival times may be removed.

Upon removing the machine-generated data traffic and leaving only the user-generated data traffic, the audience measurement module 110 may compute one or more audience measurement metrics based on the identified unique subscribers, the identified unique content names, and the user-generated data traffic. The audience measurement metrics may be computed according to application and/or content. For example, although data traffic to the NEW YORK TIMES website and to the LOS ANGELES TIMES website may be identified as separate data traffic to different applications (i.e., this example, websites), the audience measurement module may identify the data traffic together as text content.

In a first example, the audience measurement module 110 may compute the number of unique subscribers. In a second example, the audience measurement module 110 may compute the total data traffic volume in terms of the number of bytes transmitted and/or received. In a third example, the audience measurement module 110 may compute the number of data flows (i.e., unique sessions) accessing the content server 104. In a fourth example, the audience measurement module 110 may compute the number of hits generated. That is, a single data flow (e.g., a connection to the NEW YORK TIMES website) may include separate accesses to multiple web objects (e.g., the sports page, the business page, etc.).

In a fifth example, the audience measurement module 110 may compute the time spent downloading the content 112 by subtracting the start time of a data flow from the end time of the data flow. In a sixth example, the audience measurement module 110 may compute the time spent downloading and viewing the content 112 by subtracting the start time of the current content request from the start time of the next content request. If a start time of the next content request does not exist, then the start time of the current content request is subtracted from the end time of the current data flow. When determining the total amount of time that unique subscribers spend online, the audience measurement module 110 may disregard traffic transmitted towards the client computer 106 where the client computer 106 does not respond within a given time interval. For example, a probing system (not shown) may be adapted to probe the client computer 106 in order to identify open ports.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts, and modules may be implemented in software, in firmware, in special purpose digital logic, and any combination thereof. It should be appreciated that more or fewer operations may be performed than shown in the figures and described herein. These operations may also be performed in a different order than those described herein.

Figure 2:
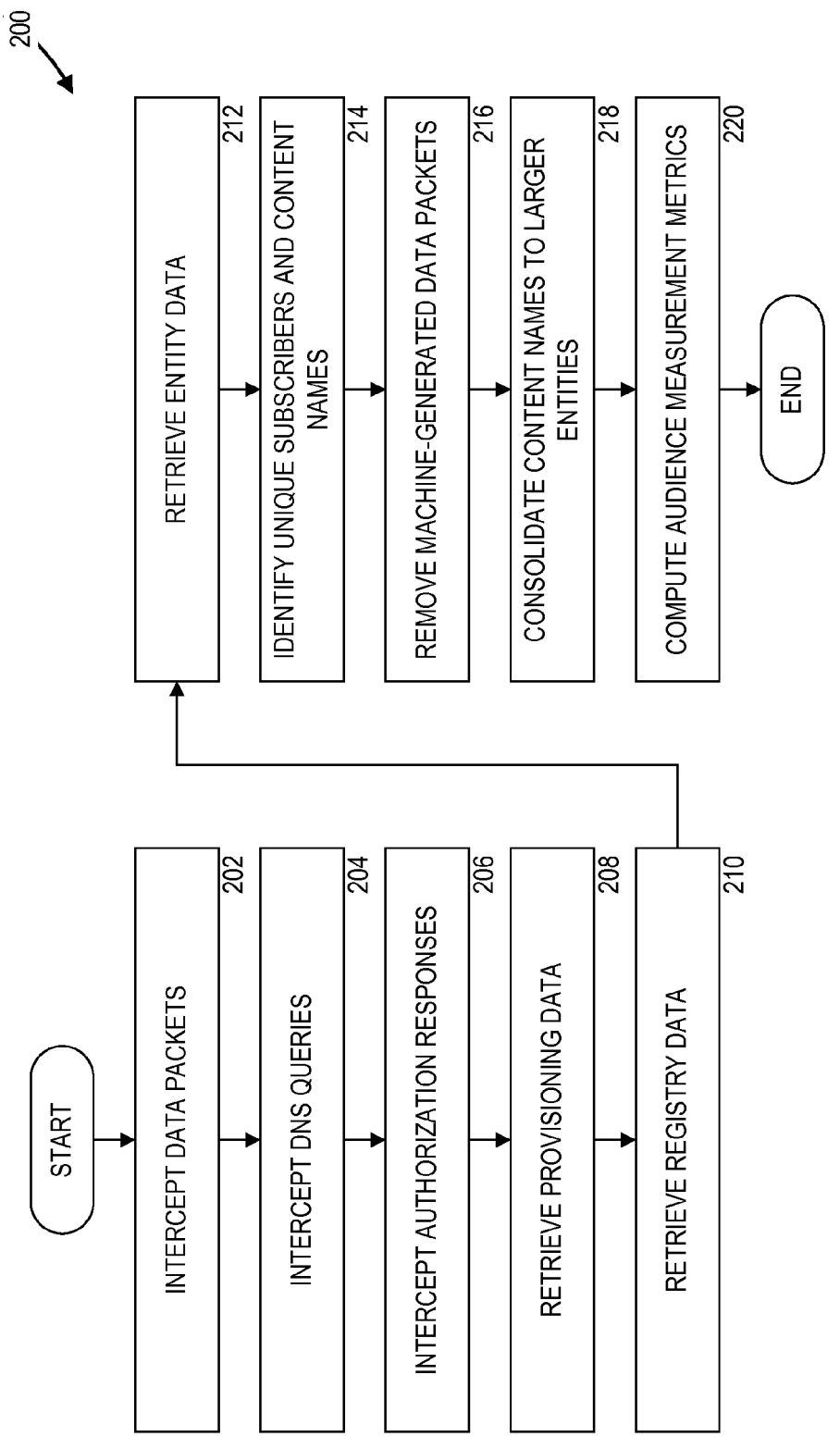
FIG. 2 is a flow diagram illustrating an exemplary method for providing network-based audience measurement, in accordance with some embodiments.

Referring to FIG. 2, additional details will be provided regarding the operation of the audience measurement module 110. In particular, FIG. 2 is a flow diagram illustrating an exemplary method 200 for providing network-based audience measurement, in accordance with some embodiments. The method 200 begins at operation 202, where the audience measurement module 110 intercepts data traffic between the client computer 106 and the content server 104. For example, the sniffer 146 may intercept the data traffic. The method 200 then proceeds to operation 204, where the audience measurement module 110 intercepts DNS queries, such as the DNS query 134, that are transmitted from the user agent 118 to the DNS server 120. For example, the sniffer 146 may intercept the DNS queries. When the audience measurement module 110 intercepts the DNS queries, the method 200 proceeds to operation 206.

At operation 206, the audience measurement module 110 intercepts authorization responses, such as the authorization response 140, that are transmitted from the RADIUS server 128 to the NAS 126. For example, the sniffer 146 may intercept the authorization responses. The method 200 then proceeds to operation 208, where the audience measurement module 110 retrieves provisioning data, such as the provisioning data 136, from the provisioning database 124. The method 200 then proceeds to operation 210, where the audience measurement module 110 retrieves registry data, such as the registry data 142, from the registry database 130. When the audience measurement module 110 retrieves the registry data, the method 200 proceeds to operation 212.

At operation 212, the audience measurement module 110 retrieves entity data, such as the entity data 144, from the entity database 132. The method 200 then proceeds to operation 214, where the audience measurement module 110 merges the intercepted data traffic, the DNS queries, the authorization responses, the provisioning data, the registry data, and the entity data and identifies unique subscribers and content names based on the merged information. In particular, the audience measurement module 110 may utilize the DNS queries, the authorization responses, and/or the provisioning data to identify content names. Further, the audience measurement module 110 may identify content names through the HTTP headers of the intercepted data packets or through the registry data 142. When the audience measurement module 110 identifies the unique subscribers and the content names, the method 200 proceeds to operation 216.

At operation 216 the audience measurement module 110 identifies machine-generated data packets and user-generated data packets in the intercepted data packets. The audience measurement module 110 then removes machine-generated data packets from the user-generated data packets, thereby leaving only the user-generated data packets. The method 200 then proceeds to operation 218, where the audience measurement module 110 consolidates content names to larger entities based on the entity data 144. The method 200 then proceeds to operation 220, where the audience measurement module 110 computes audience measurement metrics based on the identified unique subscribers, the identified unique content names, and the user-generated data traffic.

Figure 3:
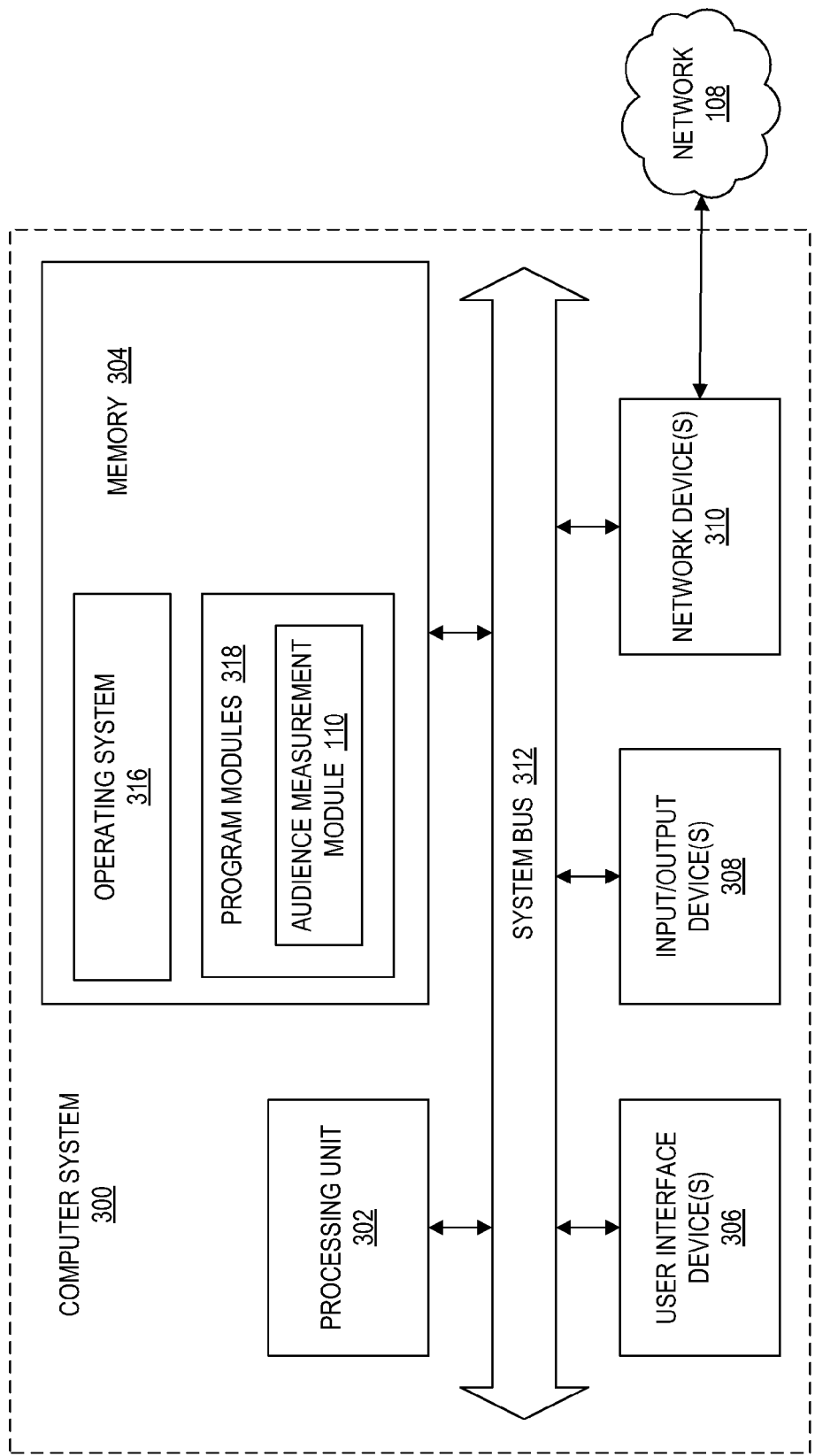
FIG. 3 is a block diagram illustrating an exemplary computer system configured to provide network-based audience measurement, in accordance with some embodiments.

FIG. 3 and the following discussion are intended to provide a brief, general description of a suitable computing environment in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 3 is a block diagram illustrating a computer system 300 configured to provide network-based audience measurement, in accordance with embodiments. The computer system 300 includes a processing unit 302, a memory 304, one or more user interface devices 306, one or more input/output ("I/O") devices 308, and one or more network devices 310, each of which is operatively connected to a system bus 312. The bus 312 enables bi-directional communication between the processing unit 302, the memory 304, the user interface devices 306, the I/O devices 308, and the network devices 310.

The processing unit 302 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 304 communicates with the processing unit 302 via the system bus 312. In one embodiment, the memory 304 is operatively connected to a memory controller (not shown) that enables communication with the processing unit 302 via the system bus 312. The memory 304 includes an operating system 316 and one or more program modules 318, according to exemplary embodiments. Examples of operating systems, such as the operating system 316, include, but are not limited to, WINDOWS, WINDOWS CE, and WINDOWS MOBILE from MICROSOFT CORPORATION, LINUX, SYMBIAN from SYMBIAN LIMITED, BREW from QUALCOMM CORPORATION, MAC OS from APPLE CORPORATION, and FREEBSD operating system. The program modules 318 include an audience measurement module 110. In some embodiments, the audience measurement module 110 is embodied in computer-readable media containing instructions that, when executed by the processing unit 302, performs the method 200 for providing network-based security services, as described in greater detail above with respect to FIG. 2. According to embodiments, the program modules 318 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 300.

The user interface devices 306 may include one or more devices with which a user accesses the computer system 300. The user interface devices 306 may include, but are not limited to, computers, servers, personal digital assistants, cellular phones, or any suitable computing devices. The I/O devices 308 enable a user to interface with the program modules 318. In one embodiment, the I/O devices 308 are operatively connected to an I/O controller (not shown) that enables communication with the processing unit 302 via the system bus 312. The I/O devices 308 may include one or more input devices, such as, but not limited to, a keyboard, a mouse, or an electronic stylus. Further, the I/O devices 308 may include one or more output devices, such as, but not limited to, a display screen or a printer.

The network devices 310 enable the computer system 300 to communicate with other networks or remote systems via the network 108. Examples of the network devices 310 may include, but are not limited to, a modem, a radio frequency ("RF") or infrared ("IR") transceiver, a telephonic interface, a bridge, a router, or a network card. The network 108 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 108 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for providing network-based audience measurement, the method comprising:
   receiving, by a computer, data packets intercepted from between a client computer and a content server, wherein the data packets comprise requests to access content from the content server via a web server on the content server;

identifying, by the computer, unique subscribers and content names based on the data packets;

determining, by the computer, that a data packet of the data packets is machine generated;

removing, by the computer, the data packet determined to be machine generated from the data packets, wherein the data packets remaining after the data packet determined to be machine generated is removed are user-generated data packets; and computing, by the computer, an audience measurement metric based on the unique subscribers, the content names, and the user-generated data packets, wherein the audience measurement metric comprises an amount of time spent by a user accessing the content via the client computer.

2. The method of claim 1, further comprising intercepting domain name system queries to a domain name system server, wherein the content names are identified by merging the data packets and the domain name system queries.

3. The method of claim 1, further comprising intercepting authorization responses from a remote authentication dial in user service server, wherein the unique subscribers are identified by merging the data packets and the authorization responses.

4. The method of claim 1, further comprising retrieving provisioning data from a provisioning database, wherein the unique subscribers are identified by merging the data packets and the provisioning data.

5. The method of claim 1, further comprising retrieving registry data from a registry database, wherein the content names are identified by merging the data packets and the registry data.

6. The method of claim 1, wherein determining that a data packet of the data packets is machine generated comprises determining that the data packet is directed to an update server.

7. The method of claim 1, wherein the audience measurement metric further comprises at least one of a number of the unique subscribers, a data traffic volume, a number of data flows generated, a number of hits generated, an amount of time spent downloading content from the content server, and an amount of time spent downloading and viewing content from the content server.

8. A system for providing network-based audience measurement, comprising:

a processor; and a memory storing instructions that, when executed by the processor, cause the processor to perform operations comprising:

receiving data packets intercepted from between a client computer and a content server, wherein the data packets comprise requests to access content from the content server via a web server on the content server, identifying unique subscribers and content names based on the data packets, determining that a data packet of the data packets is machine generated, removing the data packet determined to be machine generated from the data packets, wherein the data packets remaining after the data packet determined to be machine generated is removed are user-generated data packets, and computing an audience measurement metric based on the unique subscribers, the content names, and the user-generated data packets, wherein the audience measurement metric comprises an amount of time spent by a user accessing the content via the client computer.

9. The system of claim 8, wherein the instructions, when executed by the processor, cause the processor perform further operations comprising intercepting domain name system queries to a domain name system server, wherein the content names are determined by merging the data packets and the domain name system queries.

10. The system claim 8, wherein the instructions, when executed by the processor, cause the processor perform further operations comprising intercepting authorization responses from a remote authentication dial in user service server, wherein the unique subscribers are identified by merging the data packets and the authorization responses.

11. The system of claim 8, wherein the instructions, when executed by the processor, cause the processor perform further operations comprising retrieving provisioning data from a provisioning database, wherein the unique subscribers are determined by merging the data packets and the provisioning data.

12. The system of claim 8, wherein the instructions, when executed by the processor, cause the processor perform further operations comprising retrieving registry data from a registry database, wherein the content names are determined by merging the data packets and the registry data.

13. The system of claim 8, wherein determining that a data packet of the data packets is machine generated comprises determining that the data packet is directed to an update server.

14. A computer-readable storage device storing instructions that, when executed by a processor, cause the processor to perform operations comprising:

receiving intercepting data packets intercepted from between a client computer and a content server, wherein the data packets comprise requests to access content from the content server via a web server on the content server; identifying unique subscribers and content names based on the data packets; determining that a data packet of the data packets is machine generated; removing the data packet determined to be machine generated from the data packets, wherein the data packets remaining after the data packet determined to be machine generated is removed are user-generated data packets; and computing one or more an audience measurement metric metrics based on the unique subscribers the content names, and the user-generated data packets, wherein the audience measurement metric comprises an amount of time spent by a user accessing the content via the client computer.

15. The computer-readable storage device of claim 14, comprising further instructions that, when executed by the processor, cause the processor to perform rising intercepting domain name system queries to a domain name system server, wherein the content names are identified by merging the data packets and the domain name system queries.

16. The computer-readable medium storage device of claim 14, storing further instructions that, when executed by the processor, cause the processor to perform operations comprising intercepting authorization responses from a remote authentication dial in user service server, wherein the unique subscribers are determined by merging the data packets and based-en the authorization responses.

17. The computer-readable storage device of claim 14, storing further instructions that, when executed by the processor, cause the processor to perform operations comprising retrieving provisioning data from a provisioning database, wherein the unique subscribers are determined by merging the data packets and the provisioning data.

18. The computer-readable storage device of claim 14, storing further instructions that, when executed by the processor, cause the processor to perform operations comprising retrieving registry data from a registry database, wherein the content names are determined by merging the data packets and the registry data.

19. The computer-readable storage device of claim 14, wherein determining that a data packet of the data packets is machine generated comprises determining that the data packet is directed to an update server.

20. The computer-readable storage device of claim 14, wherein the audience measurement metric further comprises at least one of a number of unique subscribers, a data traffic volume, a number of data flows generated, a number of hits generated, an amount of time spent downloading content from the content server, and an amount of time spent downloading and viewing content from the content server.

* * * * *